United States Patent
Yamamoto et al.

(10) Patent No.: US 12,105,980 B2
(45) Date of Patent: *Oct. 1, 2024

(54) APPENDING DATA TO A TAPE CARTRIDGE DURING RECALL OPERATIONS

(71) Applicant: International Business Machines Corporation, Armonk, NY (US)

(72) Inventors: Noriko Yamamoto, Tokyo (JP); Hiroshi Itagaki, Yokohama (JP); Tsuyoshi Miyamura, Yokohama (JP); Tohru Hasegawa, Tokyo (JP); Shinsuke Mitsuma, Tokyo (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,952

(22) Filed: Sep. 29, 2023

(65) Prior Publication Data

US 2024/0028238 A1    Jan. 25, 2024

Related U.S. Application Data

(63) Continuation of application No. 17/486,970, filed on Sep. 28, 2021, now Pat. No. 11,809,731.

(51) Int. Cl.
  *G06F 3/06*    (2006.01)
(52) U.S. Cl.
  CPC .......... *G06F 3/0647* (2013.01); *G06F 3/0604* (2013.01); *G06F 3/0682* (2013.01)

(58) Field of Classification Search
  CPC ...... G06F 3/0604; G06F 3/061; G06F 3/0647; G06F 3/0682; G11B 5/488; G11B 5/4907;
  (Continued)

(56) References Cited

U.S. PATENT DOCUMENTS

| 8,966,169 B2 * | 2/2015 | Shiratori ............ G11B 5/00817 711/143 |
| 9,135,949 B2 | 9/2015 | Shiratori |

(Continued)

FOREIGN PATENT DOCUMENTS

| JP | 2011134413 A | 7/2011 |
| JP | 2019067186 A | 4/2019 |

(Continued)

OTHER PUBLICATIONS

Bessone et al., "Increasing the efficiency of tape-based storage backends", 17th International Conference on Computing in High Energy and Nuclear Physics (CHEP09), IOP Publishing, Journal of Physics: Conference Series 219 (2010) 062038, doi:10.1088/1742-6596/219/6/062038, 8 pages.

(Continued)

*Primary Examiner* — Reginald G Bragdon
*Assistant Examiner* — Aaron D Ho
(74) *Attorney, Agent, or Firm* — Randy Tejeda

(57) ABSTRACT

A tool for tape library hierarchical storage management. The tool determines there is available tape capacity on a tape cartridge mounted to a tape drive to migrate data from a migration queue during recall operations. The tool sends a locate end of data (EOD) command to the tape drive. The tool determines the migration queue is within a longitudinal position (LPOS) range. The tool writes data from the migration queue to the tape cartridge within the LPOS range.

25 Claims, 4 Drawing Sheets

(58) Field of Classification Search
CPC ....... G11B 5/4969; G11B 5/54; G11B 5/5534; G11B 5/5547; G11B 5/584; G11B 5/596
USPC .......................................................... 711/154
See application file for complete search history.

(56) References Cited

U.S. PATENT DOCUMENTS

| | | |
|---|---|---|
| 9,213,496 B2 | 12/2015 | Gibble |
| 10,818,314 B1 | 10/2020 | Miyamura |
| 2011/0276756 A1 | 11/2011 | Bish |
| 2011/0286123 A1 | 11/2011 | Montgomery |
| 2012/0154946 A1 | 6/2012 | Katagiri |
| 2014/0063642 A1 | 3/2014 | Argumedo |
| 2014/0146650 A1 | 5/2014 | Alber |
| 2016/0011792 A1 | 1/2016 | Hirashima |
| 2016/0011793 A1 | 1/2016 | Iwasaki |
| 2017/0126780 A1 | 5/2017 | Freitag |
| 2017/0153833 A1 | 6/2017 | Iwasaki |
| 2017/0357451 A1 | 12/2017 | Hasegawa |
| 2018/0053529 A1 | 2/2018 | Abe |
| 2019/0361606 A1 | 11/2019 | Goker |
| 2019/0361622 A1 | 11/2019 | Hasegawa |
| 2019/0384520 A1 | 12/2019 | Araki |
| 2021/0064298 A1 | 3/2021 | Hasegawa |
| 2021/0064486 A1 | 3/2021 | Rana |
| 2023/0097031 A1 | 3/2023 | Yamamoto |

FOREIGN PATENT DOCUMENTS

| | | |
|---|---|---|
| TW | 201211879 A | 3/2012 |
| TW | 201230018 A | 7/2012 |
| WO | 2012176539 A1 | 2/2015 |

OTHER PUBLICATIONS

Notification of Transmittal of the International Search Report and the Written Opinion of the International Searching Authority, or the Declaration, International application No. PCT/EP2022/075378, Mailed on Dec. 22, 2022, 12 pages.

List of IBM Patents or Patent Applications Treated as Related, Filed Herewith, 2 pages.

* cited by examiner

APPENDING DATA TO A TAPE CARTRIDGE DURING RECALL OPERATIONS

BACKGROUND OF THE INVENTION

The present invention relates generally to tape library hierarchical storage management, and more particularly to appending data to a tape cartridge when reading data.

The growing volume of data, and the storage capacity to service information technology, has increased over the years. Other significant trends that affect planning storage strategies include data migration to storage.

Tape cartridges have traditionally been used for video archives, back-up files, replicas for disaster recovery, and retention of information on premise. Tape cartridges are commonly stored in enterprise tape libraries. In order to preserve these tape cartridges, high-density tape library frames containing high-density (HD) tape cartridge storage slots are utilized, where a single HD tape cartridge storage slot can hold up to five tape cartridges stacked in a row, instead of a single tape to a storage slot. Each tape cartridge in the HD tape cartridge storage slot is referenced with a tier number indicating a position within the HD tape cartridge storage slot, where the tier number increases in a depth direction as more tape cartridges are added to the HD tape cartridge storage slot.

Tape library frames having hierarchical storage management (HSM) include a plurality of tape drives, a primary storage device composed of a hard drive disk (HDD) for storing data, and a plurality of tape cartridges for further storing the data during migration operations. A pre-migration state exists when the data is stored on both the primary storage device and the plurality of tape cartridges. After a certain period of time, the data in the primary storage device is deleted and the data is only stored on the plurality of tape cartridges (i.e., a migration state).

Reading data stored on a plurality of tape cartridges in a migration state is referred to as recall. When a host (e.g., a server computer, computing device, etc.) requests a recall operation, a tape drive mounts a tape cartridge from the plurality of tape cartridges, the tape drive reads the data stored on the tape cartridge to a primary storage device, and then transfers the data to the host. Where a request for migration is made during a recall operation, the migration is queued due to a higher priority of the recall operation.

When multiple requests for recall or migration are made at one time, the recall requests are accumulated in a recall queue, and the migration requests are accumulated in a migration queue on a host. When there are no more recall requests accumulated in the recall queue, and the recall operation is interrupted for a certain period of time, a mounted tape cartridge may be used for a migration operation as long as the mounted tape cartridge used for recall has available storage capacity.

SUMMARY

Aspects of an embodiment of the present invention disclose an apparatus, a method, a computer program product, and a computer system for tape library hierarchical storage management Aspects of an embodiment of the present invention disclose a method for tape library hierarchical storage management. The method includes determining, by the one or more computer processors, there is available tape capacity on the tape cartridge mounted to a tape drive to migrate data from a migration queue during recall operations. The method further includes sending, by the one or more computer processors, a locate end of data (EOD) command to the tape drive. The method further includes determining, by the one or more computer processors, the migration queue is within a longitudinal position (LPOS) range. The method further includes writing, by the one or more computer processors, data from the migration queue to the tape cartridge within the LPOS range.

Aspects of an embodiment of the present invention disclose a method for tape library hierarchical storage management. The method includes detecting, by one or more computer processors, at least one recall request in a recall queue on a host. Responsive to a determination that there is a migration queue on the host, the method further includes determining, by the one or more computer processors, there is available tape capacity on the tape cartridge to migrate data concurrently while fulfilling the at least one recall request. Responsive to a determination that there is available tape capacity on the tape cartridge to migrate data, the method further includes sending, by the one or more computer processors, a locate end of data (EOD) command to the tape drive. Responsive to a determination that the migration queue is within a longitudinal position (LPOS) range, the method further includes writing, by the one or more computer processors, data from the migration queue to the tape cartridge within the LPOS range.

Aspects of an embodiment of the present invention disclose a method for tape library hierarchical storage management. The method includes detecting, by one or more computer processors, at least one recall request in a recall queue on a host, wherein detecting the at least one recall request in the recall queue includes mounting a tape cartridge to a tape drive to satisfy the at least one recall request. Responsive to a determination that there is a migration queue on the host, the method includes determining, by the one or more computer processors, whether there is available tape capacity mounted on a tape cartridge mounted to a tape drive to migrate data during recall operations. Responsive to a determination that there is available tape capacity on the tape cartridge to migrate data, the method includes sending, by the one or more computer processors, a locate end of data (EOD) command to the tape drive. Responsive to a determination that a longitudinal position (LPOS) range returned from the tape drive is not a value of zero, the method includes determining, by the one or more computer processors, whether the migration queue is within the LPOS range. Responsive to a determination that the migration queue is within the LPOS range, the method includes writing, by the one or more computer processors, data from the migration queue to the tape cartridge within the LPOS range.

Aspects of an embodiment of the present invention disclose a computer program product for tape library hierarchical storage management. The computer program product includes program instructions to determine if there is available tape capacity on a tape cartridge mounted to a tape drive to migrate data from a migration queue during recall operations. The computer program product includes program instructions to send a locate end of data (EOD) command to the tape drive. The computer program product includes program instructions to determine the migration queue is within a longitudinal position (LPOS) range. The computer program product includes program instructions to write data from the migration queue to the tape cartridge within the LPOS range.

Aspects of an embodiment of the present invention disclose a computer system for tape library hierarchical storage management. The computer system includes program instructions to determine if there is available tape capacity on a tape cartridge mounted to a tape drive to migrate data from a migration queue during recall operations. The computer system includes program instructions to send a locate end of data (EOD) command to the tape drive. The computer system includes program instructions to determine the migration queue is within a longitudinal position (LPOS) range. The computer system includes program instructions to write data from the migration queue to the tape cartridge within the LPOS range.

DETAILED DESCRIPTION

Figure 1:
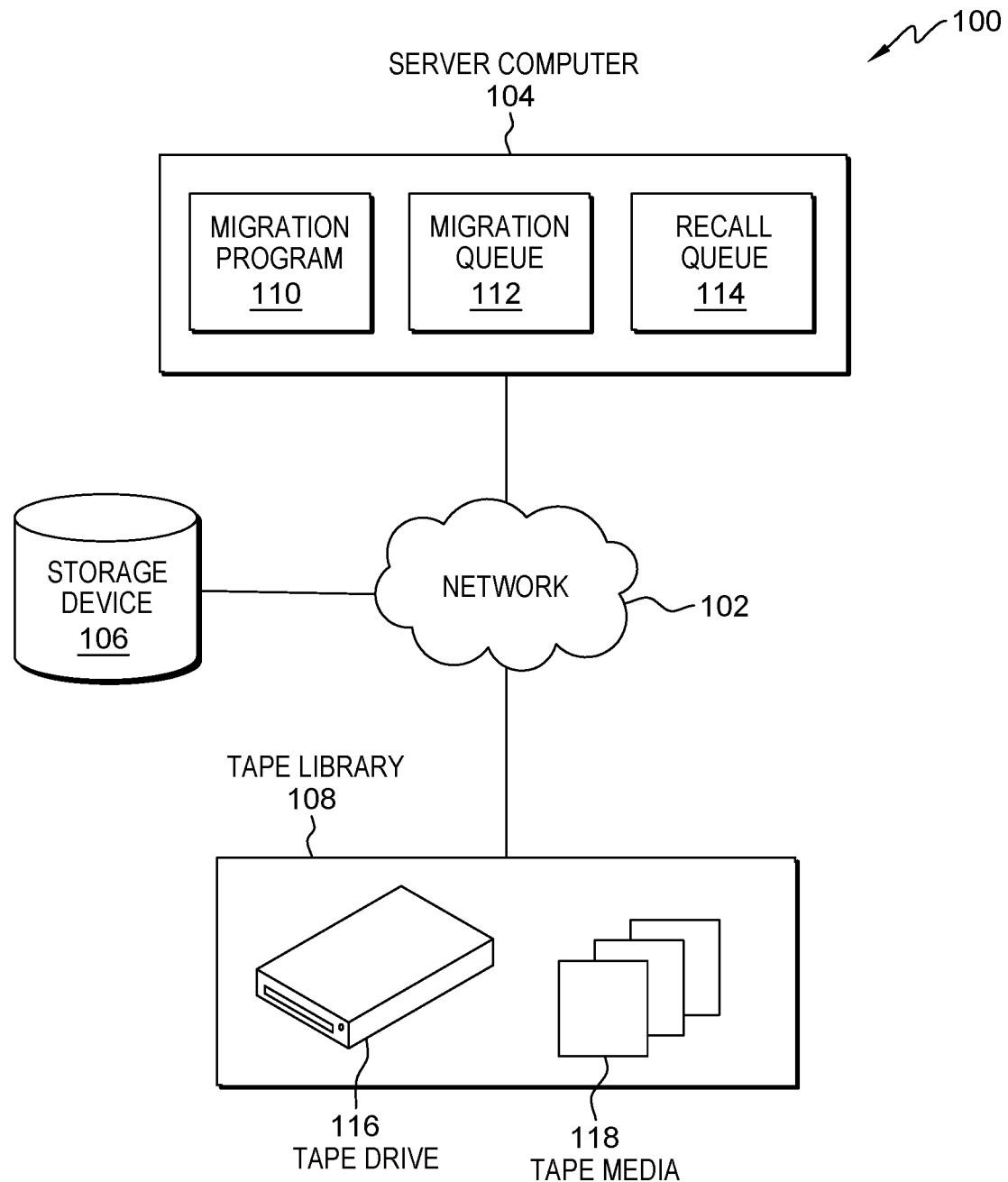
FIG. 1 illustrates a tape library hierarchical storage management environment, in accordance with an embodiment of the present invention.

Embodiments of the present invention recognize that when the recall requests are accumulated in the recall queue, migration operations with lower priority may be queued for a significant amount of time, and as such, data can be continuously accumulated in a primary storage device.

Embodiments of the present invention recognize that in tape library hierarchical storage management environments having a plurality of tape drives, some of the plurality of tape drives may be assigned to migration operations or assigned to migration operations for a certain period of time after a pre-determined amount of data is accumulated in a migration queue. Embodiments of the present invention recognize that in these scenarios, various migration and recall operation rules may be previously established, such that migration operations and recall operations are not simultaneously requested to a tape drive or tape cartridge.

Embodiments of the present invention recognize that it may take about two minutes to move a tape drive read/write head from end to end of a tape cartridge in a longitudinal direction. For example, where a current position of a tape drive read/write head is far from a longitudinal position (LPOS) of recall data, it takes roughly two minutes for the read/write head to move to a read position. Embodiments of the present invention recognize that a magnetic tape cartridge is a recordable medium, and a current tape cartridge write speed is about 900 megabytes per second (MB/s) maximum when writing compressed data.

Embodiments of the present invention recognize an advantage to writing data on a tape cartridge during tape drive read/write head movement from end to end of the tape cartridge. Embodiments of the present invention recognize that a volume of data as much as 100 gigabytes (GB) can be written on the tape. Embodiments of the present invention recognize that a method of writing data on a tape cartridge during recall provides a performance improvement to a tape library hierarchical storage management environment by facilitating performance of migration operations simultaneously during recall operations.

Embodiments of the present invention provide the capability to migrate data to a tape cartridge that is simultaneously being utilized for a recall operation. Embodiments of the present invention provide the capability for a host to send a defined locate end of data (EOD) command, such as "Locate EOD", to a tape drive, with a number of next read data being used as an argument. Embodiments of the present invention provide the capability for a tape drive to determine whether data is appendable after EOD during locating a read/write head to read data from a positional relationship between a current read/write head position, EOD, and a read data read/write head position on a tape cartridge. Embodiments of the present invention provide the capability to, when a tape drive read/write head locates to EOD on a tape cartridge, return an appendable value (i.e., appendable size/capacity on the tape cartridge) to a host, and where the appendable value is not zero, the host writes data queued for migration on the tape cartridge simultaneously with concurrent recall operations (i.e., reading data) being performed on the tape cartridge.

Embodiments of the present invention provide the capability to utilize a locate end of data (EOD) command, which is an extended conventional locate command that can be added to a tape drive. Embodiments of the present invention provide the capability for a host to send a locate EOD command to a tape drive, where the locate EOD command utilizes a logical object identifier of the beginning of recall (BOR) data as an argument. Embodiments of the present invention provide the capability for a tape drive to determine whether there is an EOD location on the way from a current read/write head position to BOR, and where there is an EOD location between the current read/write head position and BOR, determine an appendable longitudinal position (LPOS) range between EOD and BOR. Embodiments of the present invention provide the capability to, where there is an appendable LPOS range, locate a read/write head to EOD and return to the host the appendable LPOS range. Embodiments of the present invention provide the capability to, where there is no appendable LPOS range, locate a read/write head to BOR and return to the host a value of zero indicating no appendable LPOS range.

Embodiments of the present invention provide the capability to perform migration during recall operations with a minimum influence on reading data, without waiting for all recall requests accumulated in a recall queue to end, thereby improving performance of a combination of recall and migration operations.

Embodiments of the present invention recognize that with this method, in locating to the beginning of recall data, there can be a time increase of one and a half to three seconds for one or two wrap changes, or three seconds for back hitch (i.e., operation to once stop and return the tape head) when reading EOD. However, locating is an operation lasting an average of forty-five seconds to two minutes maximum, and thus an influence of the time increase on performance is about ten percent of that of locating. An overall influence is less than ten percent as compared to a time for a combination of locating and reading, considering migration is not performed for every recall operation. Overall efficiency of recall and migration operations can be increased while minimizing negative influences on recall operations while performing migration simultaneously.

Embodiments of the present invention provide the capability for a host to control movement of a tape drive read/write head to an append position or a recall position utilizing a locate command, without requiring a mode sense command to obtain a position, thereby reducing load on the host and the tape drive while providing more efficient performance for recall and migration operations.

Implementation of such embodiments may take a variety of forms, and exemplary implementation details are discussed subsequently with reference to the Figures.

Referring now to various embodiments of the invention in more detail, FIG. 1 is a functional block diagram that illustrates a portion of a tape library hierarchical storage management environment, generally designated 100, suitable for providing tape library hierarchical storage management, in accordance with at least one embodiment of the invention. In one embodiment, tape library hierarchical storage management environment 100 includes a network, such as network 102, a host, such as server computer 104, a primary storage device, such as storage device 106, and a tape library, such as tape library 108. In one embodiment, a plurality of tape library frames (not shown), can be interconnected to form one or more tape libraries, such as tape library 108. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. In one embodiment, server computer 104, storage device 106, and tape library 108 are interconnected by network 102. In one embodiment, network 102 can be any combination of connections and protocols capable of supporting data migration and data recall within a tape library hierarchical storage management environment, such as tape library hierarchical storage management environment 100, between a host, such as server computer 104, a primary storage device, such as storage device 106, a secondary storage location, such as tape library 108, utilizing a migration program, such as migration program 110. In one embodiment, network 102 connects a host, such as server computer 104, to a primary storage device, such as storage device 106, a secondary storage location, such as tape library 108 utilizing any fiber channel protocol, such as small computer system interface (SCSI), internet protocol-based iSCSI over transmission control protocol/internet protocol (TCP/IP) and serial attached SCSI (SAS), capable of supporting SCSI commands.

In another embodiment, network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments that may be implemented by those skilled in the art.

In one embodiment, a host, such as server computer 104, may be, for example, a server computer system, such as a database management server, a tape library management server, database server, a web server, a structured query language server or any other electronic device or computing system capable of sending and receiving data. In one embodiment, server computer 104 may be a mainframe virtual tape solution that optimizes data migration operations and data recall operations. In one embodiment, server computer 104 may write data to physical tape storage utilizing high performance tape drives installed in a tape library, such as tape library 108, utilizing SCSI commands. In one embodiment, server computer 104 may provide a tiered storage hierarchy of disk and tape storage caches. In another embodiment, server computer 104 may be a data center comprising a collection of networks and servers providing an IT service, such as virtual servers and applications deployed on virtual servers, to an external party. In one embodiment, server computer 104 may be a database server operating on a legacy system, such as a mainframe system. In another embodiment, server computer 104 represents a "cloud" of computers interconnected by one or more networks, such as network 102, where server computer 104 is a computing system utilizing clustered computers and components to act as a single pool of seamless resources when accessed through network 102. This is a common implementation for data centers in addition to cloud computing applications. In the one embodiment, server computer 104 includes a migration program, such as migration program 110, a migration queue, such as migration queue 112, and a recall queue, such as recall queue 114.

In an alternative embodiment, the host may be a client computer (not shown) that is a client to a host, such as server computer 104, and may be, for example, a server, a desktop computer, a laptop computer, a tablet computer, a personal digital assistant (PDA), a smart phone, a thin client or any other electronic device or computing system capable of communicating with server computer 104 through network 102 within a tape library hierarchical storage management environment, such as tape library hierarchical storage management environment 100. For example, the client computer may be a laptop computer capable of connecting to a network, such as network 102, to submit one or more migration and/or recall commands to a primary storage device, such as storage device 106, and a tape library, such as tape library 108, utilizing a migration program, such as migration program 110, via a host, such as server computer 104. In another embodiment, the client computer may be any suitable type of client device capable of submitting one or more recall or migration requests (e.g., read or write requests) to a host, such as server computer 104. In one embodiment, the client computer may include a user interface (not shown) for submitting data requests to a data tape management server, such as server computer 104. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels or text navigation. In computers, GUIs were introduced in reaction to the perceived steep learning curves of command-line interfaces, which required commands to be typed on the keyboard. The actions in GUIs are often performed through direct manipulation of the graphics elements.

In one embodiment, migration program 110 operates on a central server, such as server computer 104, and may be utilized by one or more client computers (not shown) via network 102. In another embodiment, migration program 110 may be a software-based program downloaded from the central server or a third-party provider (not shown) and executed on a client computer to append data to a tape cartridge simultaneously being utilized during a recall operation. In another embodiment, migration program 110 may be a software-based program, downloaded from a central server (not shown) and installed on one or more client devices (e.g., a phone, a tablet, a wearable electronic device, etc.) (not shown). In yet another embodiment, migration program 110 may be utilized as a software service provided by a third-party cloud service provider (not shown). In yet another embodiment, migration program 110 may include one or more software-based components, such as add-ons, plug-ins, and agent programs, etc., installed on one or more client devices, to append data (i.e., perform a migration operation) to a tape cartridge simultaneously being utilized during a recall operation.

In one embodiment, migration program 110 is a software-based program for appending data to a tape cartridge during a recall operation. In one embodiment, migration program 110 provides a mechanism for utilizing a locate end of data (EOD) command, which is an extended conventional locate command that can be added to a tape drive. In one embodiment, migration program 110 provides a mechanism for a host to send a locate EOD command to a tape drive, where the locate EOD command is a defined SCSI command used to control a tape drive and transfer a large quantity of data to a storage device, including, but not limited to, hard disk drives, solid state drives, tape drives, etc., and where the locate EOD command utilizes a logical object identifier of the beginning of recall (BOR) data as an argument. In one embodiment, migration program 110 provides a mechanism for a tape drive to determine whether there is an EOD location on the way from a current read/write head position to BOR, and where there is an EOD location between the current read/write head position and BOR, determine an appendable longitudinal position (LPOS) range between EOD and BOR. In one embodiment, migration program 110 provides a mechanism to, where a tape drive determines an appendable LPOS range, locate a read/write head to EOD and return the appendable LPOS range to a host. In one embodiment, migration program 110 provides a mechanism to, where a tape drive determines no appendable LPOS range exists, locate a read/write head to BOR and return a value of zero indicating no appendable LPOS range to a host. In one embodiment, a migration program, such as migration program 110, works for each tape media and each tape drive within a tape library.

In an alternative embodiment, migration program 110 determines whether there is data to be migrated from the primary storage to the secondary storage. In the alternative embodiment, when there is the data to be migrated, migration program 110 sends, to a tape drive that stores data to be recalled, a command to check whether the data to be migrated can be written during movement of a head for reading the data to be recalled. In the alternative embodiment, when the tape drive responds that the data to be migrated can be written during the movement, migration program 110 selects data to be migrated of a writable size. In the alternative embodiment, migration program 110 transmits the selected data to be migrated to the tape drive.

In one embodiment, migration queue 112 and recall queue 114 are first-in-first-out (FIFO) data structures that include a collection of data requests for a primary storage device, such as storage device 106, and a tape library, such as tape library 108, in a tape library hierarchical storage management environment, such as tape library hierarchical storage management environment 100. In one embodiment, migration queue 112 may be a linear data structure that provides the capability to accumulate one or more migration requests for data to be written from a primary storage device, such as storage device 106, to one or more magnetic tape cartridges of a tape library, such as tape media 118 of tape library 108.

In one embodiment, recall queue 114 may be a linear data structure that provides the capability to accumulate one or more recall requests for data to be read from one or more magnetic tape cartridges of a tape library, such as tape media 118 of tape library 108, and sent to a primary storage device, such as storage device 106. In one embodiment, migration queue 112 is a shared queue, processed exclusively.

In one embodiment, storage device 106 is a primary storage device utilized in a tape library hierarchical storage management environment, such as tape library hierarchical storage management environment 100. In one embodiment, storage device 106 may be a hard disk drive (HDD) capable of storing pre-migrated data prior to migration to one or more magnetic tape cartridges of a tape library, such as tape media 118 of tape library 108. In one embodiment, storage device 106 may be a hard disk drive (HDD) capable of receiving recalled data from one or more magnetic tape cartridges of a tape library, such as tape media 118 of tape library 108. In one embodiment, storage device 106 is a resident state storage solution in a HSM environment where data may be written prior to migration to a secondary storage solution, such as tape library 108. In one embodiment, storage device 106 may include one or more databases capable of receiving, organizing, retrieving, and storing data in a HSM environment. In one embodiment, storage device 106 may be a solid-state drive (SSD) capable of storing pre-migrated data prior to migration to one or more magnetic tape cartridges of a tape library, such as tape media 118 of tape library 108. In one embodiment, storage device 106 may be a solid-state drive (SSD) capable of receiving recalled data from one or more magnetic tape cartridges of a tape library, such as tape media 118 of tape library 108.

In one embodiment, tape library 108 is a tape storage library interconnected with a host (e.g., a tape library mainframe, a client computer, etc.), such as server computer 104. In one embodiment, tape library 108 provides the capability to store data through the use of an integrated tape drive, such as tape drive 116, and one or more magnetic tape cartridges, such as tape media 118. In one embodiment, tape library 108 may represent a plurality of interconnected physical tape libraries. In one embodiment, a plurality of tape library frames (not shown) can be interconnected to form one or more tape libraries, such as tape library 108. In one embodiment, one or more tape libraries, such as tape library 108, can be organized into a plurality of columns evenly spaced within a floor space (i.e., a designated space within, for example, a physical structure). In another embodiment, one or more tape library frames may be stacked atop one or more tape libraries organized into the plurality of columns to satisfy growth demands of big data tape management, within an existing floor space, by effectively building up, as opposed to building out. In one embodiment, tape library 108 includes a tape gripper (not shown) for retrieving one or more tape cartridges, such as tape media 118, from a plurality of tape cartridge storage slots (not shown) within one or more interconnected tape library frames (not shown) designated for tape storage and inserting the one or more tape cartridges into a tape drive (i.e., mount), such as tape drive 116, for read/write operations.

In one embodiment, tape drive 116 is a data storage device for executing read and write information on one or more tape cartridges. In one embodiment, tape drive 116 is arranged in a column within a tape library frame of a tape library, such as tape library 108. In one embodiment, tape drive 116 and one or more tape cartridges, such as tape media 118, are stored separately within a tape library frame, or within a tape library, such as tape library 108, that includes one or more tape library frames (i.e., tape media 118 is stored separately from tape drive 116, in one or more tape library frames dedicated for tape media storage). In one embodiment, a tape library, such as tape library 108, includes a plurality of tape drives for executing read and write information on the one or more tape cartridges.

In an alternative embodiment, tape drive 116 includes one or more integrated programs (not shown), such as migration program 110, a primary storage device (not shown) and a secondary storage device (not shown) for receiving, from a host, a command to check whether data to be migrated can be written during movement of a head for reading data to be recalled. In the alternative embodiment, upon receiving the command, the tape drive, such as tape drive 116, determines whether a write start position is between a current head position and a read start position, and a direction of movement to the read start position is the same as a direction of movement in writing. In the alternative embodiment, when a write start position is between a current head position and a read start position, and a direction of movement to the read start position is the same as a direction of movement in writing, the tape drive, such as tape drive 116, responds to a host that the data to be migrated can be written together with a writable size. In the alternative embodiment, the tape drive, such as tape drive 116, reads data to be recalled from the read start position after writing data to be migrated transmitted from the host as a reply to the respond.

In one embodiment, tape media 118 is a magnetic tape cartridge capable of storing data within a tape library, such as tape library 108. In one embodiment, tape media 118 may be high-density magnetic tape media capable of storing digital information within a tape library, such as tape library 108. In one embodiment, one or more tape cartridges, such as tape media 118, may be stored within a high-density storage slot (not shown) within a tape library, such as tape library 108, where the high-density storage slot is capable of storing up to five tape cartridges stacked in a row within a single slot space within a tape library frame (not shown) of tape library 108. In one embodiment, tape media 118 may be linear tape open (LTO) tape cartridges. In another embodiment, tape media 118 may be enterprise tape cartridges. For example, high-density storage slots are capable of storing up to five tape cartridges in a tiered orientation, with a tier 5 position on linear tape open (LTO) tape cartridges being a first tape cartridge loaded into the slot (rear-most tape cartridge on a depth side of a tape library frame), and a tier 1 position being a last tape cartridge loaded into the slot (forward-most tape cartridge on a front side of a tape library frame). Where a tier 5 position LTO tape cartridge is requested, the LTO tape cartridges forward of it (up to four cartridges), need to be removed in order to access the requested LTO tape cartridge. In alternative embodiments, high-density storage slots, are capable of storing up to four tape cartridges in a tiered orientation, with a tier 4 position on enterprise tape cartridges being a first tape cartridge loaded into the slot (rear-most tape cartridge), and a tier 1 position being a last tape cartridge loaded into the slot (forward-most tape cartridge). Where a tier 4 position enterprise tape cartridge is requested, the enterprise tape cartridges forward of it (up to three cartridges), need to be removed in order to access the requested enterprise tape cartridge. However, it should be appreciated that embodiments of the present invention may be practiced with a tape library having any number or type of tape media capable of being stored in any number of tiered positions within a high-density storage slot.

Figure 2:
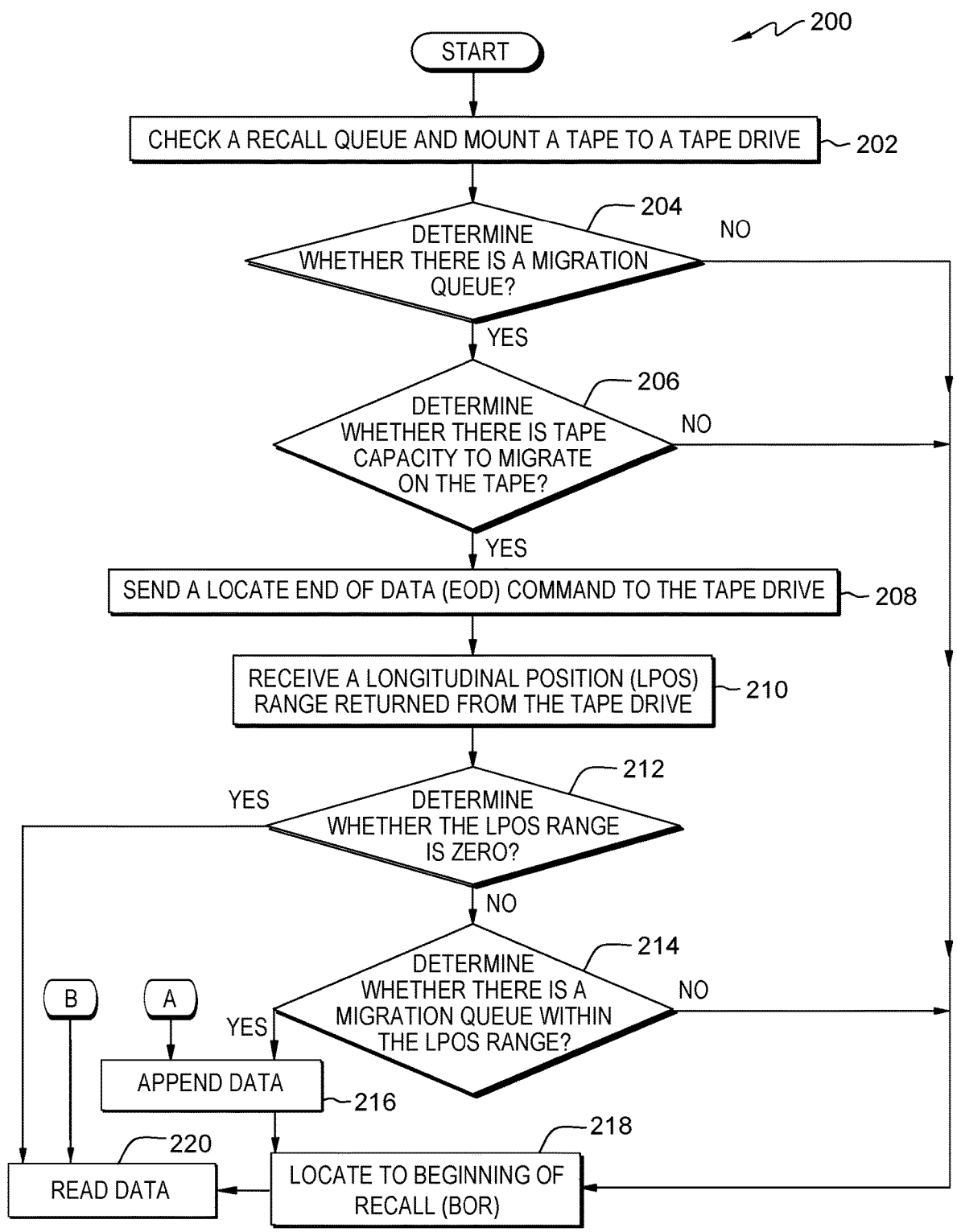
FIG. 2 is a flowchart diagram of the steps of a migration program for appending data to a tape cartridge simultaneously being utilized during a recall operation, in accordance with an embodiment of the present invention.

FIG. 2 is a flowchart diagram of the steps of a migration program, such as migration program 110, for appending data to a tape cartridge simultaneously being utilized during a recall operation, generally designated 200, in accordance with an embodiment of the present invention.

Migration program 110 checks a recall queue and mounts a tape to a tape drive (202). In one embodiment, migration program 110 checks a recall queue on a host, such as recall queue 114 of server computer 104, and mounts a tape cartridge, such as tape media 118, to a tape drive, such as tape drive 116. In one embodiment, migration program 110 checks a recall queue, such as recall queue 114, by accessing the recall queue to detect an accumulation of recall requests in the recall queue. In one embodiment, migration program 110 instructs a tape drive to mount a tape cartridge to satisfy at least one of the recall requests in the recall queue.

Migration program 110 determines whether there is a migration queue (decision block, 204). In one embodiment, migration program 110 determines whether there is a migration queue by detecting a migration queue on a host, such as migration queue 112 on server computer 104. In one embodiment, responsive to detecting a migration queue on a host, migration program 110 accesses the migration queue to identify one or more migration requests. Where migration program 110 identifies one or more migration requests in the migration queue, migration program 110 determines there is a migration queue. Where migration program 110 does not identify one or more migration requests in the migration queue, migration program 110 determines there is no migration queue. In one embodiment, migration program 110 performs recall requests directly where one or more migration requests are not accumulated in a migration queue (i.e., no migration queue).

Responsive to a determination that there is no migration queue (NO branch, 204), migration program 110 locates to beginning of recall (BOR) data (218) and reads data (220). In one embodiment, migration program 110 instructs a tape drive, such as tape drive 116, to locate a tape drive read/write head to the BOR data on a tape cartridge, as indicated by a recall request in a recall queue, such as recall queue 114, and read the data starting at the BOR location.

Responsive to a determination that there is a migration queue (YES branch, 204), migration program 110 determines whether there is tape capacity to migrate on the tape (206). In one embodiment, migration program 110 calculates a storage capacity needed to fulfill the one or more migration requests accumulated in the migration queue. Where the calculated storage capacity for the one or more migration requests accumulated in the migration queue exceeds an available storage capacity on a tape cartridge, migration program 110 determines that there is no tape capacity to migrate on the tape cartridge. Where the calculated storage capacity for the one or more migration requests accumulated in the migration queue is equal to or less than an available storage capacity on a tape cartridge, migration program 110 determines that there is tape capacity to migrate on the tape cartridge.

Responsive to a determination that there is no tape capacity to migrate on the tape (NO branch, 206), migration program 110 locates to beginning of recall (BOR) data (218) and reads data (220). In one embodiment, migration program 110 instructs a tape drive, such as tape drive 116, to locate a tape drive read/write head to the BOR data on a tape cartridge, as indicated by a recall request in a recall queue, such as recall queue 114, and read the data starting at the BOR location.

Responsive to a determination that there is tape capacity to migrate on the tape (YES branch, 206), migration program 110 sends a locate end of data (EOD) command to the tape drive (208). In one embodiment, migration program 110 sends a locate EOD command to the tape drive, where the locate EOD command utilizes a logical object identifier of beginning of recall (BOR) as an argument. In one embodiment, responsive to sending the locate EOD command to the tape drive, such as tape drive 116, migration program 110 instructs the tape drive to determine whether there is an EOD location between a current longitudinal position (LPOS) of a read/write head of the tape drive and beginning of recall (BOR). In one embodiment, migration program 110 instructs a tape drive to determine whether there is an EOD location between a current longitudinal position (LPOS) of a read/write head of the tape drive and beginning of recall (BOR) by utilizing a high-resolution tape directory (HRTD) to obtain and leverage the position of beginning of a region divided into 128 equal parts in a longitudinal direction of the tape cartridge, since at this time, the LPOS of BOR cannot be precisely known yet. In one embodiment, migration program 110 instructs the tape drive to return a determination of an EOD location between a current longitudinal position (LPOS) of a read/write head of the tape drive and beginning of recall (BOR) to a host.

Migration program 110 receives a longitudinal position (LPOS) range returned from the tape drive (210). The steps for determining the LPOS range are discussed in further detail below with respect to FIG. 3 and the discussion related to determining whether migration can be performed.

Migration program 110 determines whether the LPOS range is zero (212). In one embodiment, migration program 110 references the LPOS range returned by the tape drive, such as tape drive 116, and verifies whether the LPOS range is equal to a value of zero. Where the LPOS range is equal to a value of zero, migration program 110 determines that the LPOS range is zero. Where the LPOS range is not equal to a value of zero, migration program 110 determines that the LPOS range is not zero.

Responsive to a determination that the LPOS range is zero (YES branch, 212), migration program 110 reads the data (220). In one embodiment, responsive to a determination that the LPOS range returned from a tape drive is zero, migration program 110 automatically reads the data from the tape cartridge from the current location of the tape drive.

Responsive to a determination that the LPOS range is not zero (NO branch, 212), migration program 110 determines whether there is a migration queue within the LPOS range (214). In one embodiment, migration program 110 determines whether there is a migration queue within the LPOS range returned from the tape drive, such as tape drive 116, by selecting a size of migration data, as indicated by the one or more migration requests in the migration queue, such as migration queue 112, to prevent passage of written data through beginning of recall (BOR) due to an increase in the LPOS range due to migration. For example, for a tape drive, such as tape drive 116, where error recovery procedures (ERP) occur, migration data may have a minimum size by considering that the migration data may be written in a longer LPOS range than expected, or by setting a migration data size to an uncompressed data size, inferred from the number of longitudinal positions. Where the number of longitudinal positions on which compressed data can be written is predictable from historical cases and examples, the migration queue may be applied with a size of compressed data, such that more data can be migrated. Where data is compressed on a host, there is no need for compression by the tape drive, and therefore compression is not considered. Where migration program 110 determines that a size of migration data to be written does not pass through the BOR, migration program 110 determines that there is a migration queue within the LPOS range. Where migration program 110 determines that a size of migration data to be written passes through the BOR, migration program 110 determines that there is no migration queue within the LPOS range.

Responsive to a determination that there is no migration queue within the LPOS range (NO branch, 214), migration program 110 locates to beginning of recall (BOR) data (218) and reads data (220). In one embodiment, migration program instructs a tape drive, such as tape drive 116, to locate a tape drive read/write head to the BOR data on a tape cartridge, as indicated by a recall request in a recall queue, such as recall queue 114, and read the data starting at the BOR location.

Responsive to a determination that there is a migration queue within the LPOS range (YES branch, 214), migration program 110 appends the data (216). In one embodiment, responsive to a determination that there is a migration queue within the LPOS range, migration program 110, appends migration data (i.e., write data) from the migration queue to the tape cartridge within the LPOS range.

Responsive to appending the data, migration program 110 locates to beginning of recall (BOR) data (218) and reads data (220).

Figure 3:
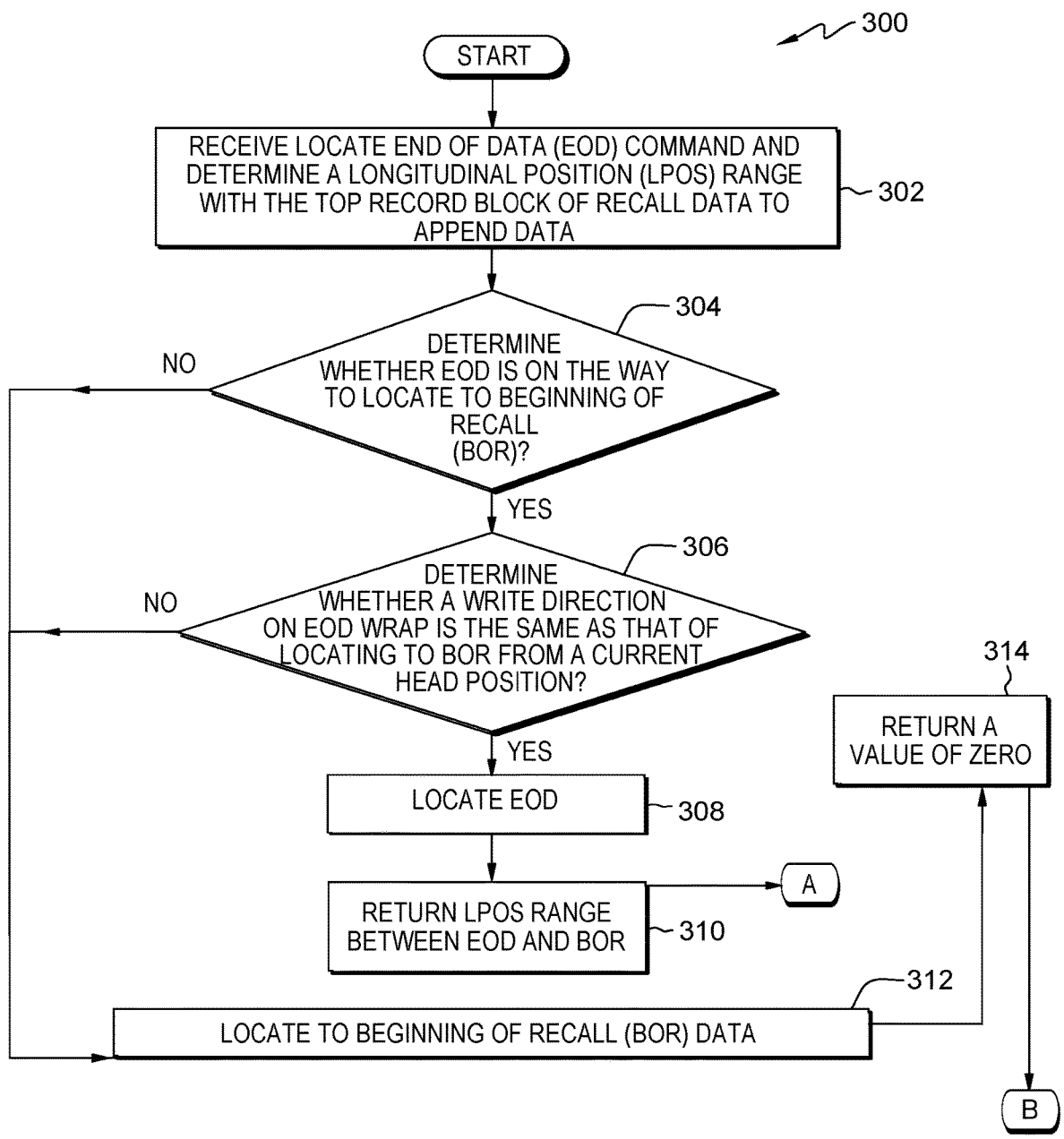
FIG. 3 is a flowchart diagram of the steps of a migration program for determining a longitudinal position range on a tape cartridge, in accordance with an embodiment of the present invention.

FIG. 3 is a flowchart diagram of the steps of a migration program, such as migration program 110, for determining a longitudinal position range on a tape cartridge, generally designated 300, in accordance with an embodiment of the present invention.

Migration program 110 determines a longitudinal position (LPOS) range with a top record block of recall data to append data (302). In one embodiment, migration program 110 instructs a tape drive that has received a locate end of data (EOD) command to determine a LPOS range with a top record block of recall data to append data.

Migration program 110 determines whether end of data (EOD) is on the way to locate to a beginning of recall (BOR) position (304). In one embodiment, migration program 110 instructs a tape drive, such as tape drive 116, to determine whether EOD on a tape cartridge is between a current read/write head position and a BOR position. Responsive to a determination that EOD on a tape cartridge falls between a current read/write head position and a BOR position, migration program 110 determines that EOD is on the way to locate to a BOR position. Responsive to a determination that EOD on a tape cartridge does not fall between a current read/write head position and a BOR position, migration program 110 determines that EOD is not on the way to locate to a BOR position. For purposes of this discussion, "to locate" refers to traveling of a read/write head from a current head position on a tape cartridge to a BOR position on the tape cartridge.

For example, a data write direction is determined for each wrap on a tape cartridge. When EOD is between a current read/write head position and BOR on the tape cartridge, and a direction of movement from the current read/write head position to BOR in the longitudinal direction of the tape is the same as a write direction in a wrap with EOD, data can be appended after EOD during locating (i.e., travel of the read/write head of the tape drive from a current position to a BOR position). In this example, migration program 110 determines that the EOD is on the way to locate to a BOR data position, and instructs a tape drive, such as tape drive 116, to return the appendable LPOS range to a host.

In another example, when EOD is between a current read/write head position and a BOR data position, and a direction of movement from the current read/write head position to the BOR data position is the same as a write direction in a wrap with EOD, and a read direction in a wrap of BOR is in an opposite direction, migration can be also performed before recall. In this example, migration program 110 determines that the EOD is on the way to locate to a BOR data position, and instructs a tape drive, such as tape drive 116, to return the appendable LPOS range to a host.

In yet another example, when EOD is not between a current read/write head position and a BOR data position, migration cannot be performed during recall and the host only performs recall operations on the tape cartridge. In this example, migration program 110 determines that the EOD is not on the way to locate to a BOR data position, and instructs a tape drive, such as tape drive 116, to return a value of zero for the LPOS range.

Responsive to a determination that end of data (EOD) is not on the way to locate to a BOR position (NO branch, 304), migration program 110 locates to beginning of recall (BOR) (312) and returns a value of zero (314). In one embodiment, migration program 110 instructs a tape drive, such as tape drive 116, to locate a tape drive read/write head to the BOR data on a tape cartridge, as indicated by a recall request in a recall queue, such as recall queue 114, and return a value of zero (314). In one embodiment, migration program 110 instructs a tape drive, such as tape drive 116, to return a value of zero for a LPOS range to a host, indicating that migration cannot be performed simultaneously during recall operations.

Responsive to a determination that end of data (EOD) is on the way to locate to a BOR position (YES branch, 304), migration program 110 determines whether a write direction on EOD wrap is the same as that of locating to BOR from a current head position (306). In one embodiment, migration program 110 instructs a tape drive, such as tape drive 116, to determine whether a write direction on EOD wrap is the same as a direction of movement for locating to BOR from a current read/write head position. Responsive to a determination that a write direction on EOD wrap is the same as a direction of movement for locating to BOR from a current read/write head position, migration program 110 determines that the write direction on EOD wrap is the same as the direction of movement for locating to BOR. Responsive to a determination that a write direction on EOD wrap is not the same as a direction of movement for locating to BOR from a current read/write head position, migration program 110 determines that the write direction on EOD wrap is not the same as the direction of movement for locating to BOR. For purposes of this discussion, "locating to" refers to traveling of a read/write head from a current head position on a tape cartridge to a BOR position on the tape cartridge.

For example, when EOD is between the current head position and BOR, but a direction of movement from a current read/write head position to BOR is opposite to a write direction in a wrap with EOD, recall is performed with EOD being skipped. In this example, migration program 110 determines that the write direction on EOD wrap is not the same as the direction of movement for locating to BOR.

In another example, when a direction of movement from the current read/write head position to BOR in the longitudinal direction of the tape, such as to the right, is the same as a write direction in a wrap with EOD, such as to the right, data can be appended after EOD during locating (i.e., traveling of the read/write head of the tape drive from a current position to a BOR position). In this example, migration program 110 determines that the write direction on EOD wrap is the same as the direction of movement for locating to BOR.

Responsive to a determination that the write direction on EOD wrap is not the same as the direction of movement for locating to BOR (NO branch, 306), migration program 110 locates to beginning of recall (BOR) (312) and returns a value of zero (314). In one embodiment, migration program 110 instructs a tape drive, such as tape drive 116, to locate a tape drive read/write head to the BOR data on a tape cartridge, as indicated by a recall request in a recall queue, such as recall queue 114, and return a value of zero (314). In one embodiment, migration program 110 instructs a tape drive, such as tape drive 116, to return a value of zero for a LPOS range to a host, indicating that migration cannot be performed simultaneously during recall operations.

Responsive to the tape drive, such as tape drive 116, returning a value of zero for a LPOS range to a host, migration program 110 proceeds to read data (path "B" to step 220 of FIG. 2).

Responsive to a determination that the write direction on EOD wrap is the same as the direction of movement for locating to BOR (YES branch, 306), migration program 110 locates EOD (308) and returns a LPOS range between EOD and BOR (310). In one embodiment, responsive to a determination that the write direction on EOD wrap is the same as the direction of movement for locating to BOR, migration program 110 instructs a tape drive, such as tape drive 116, to locate to EOD and return a LPOS range between EOD and BOR to a host for migrating data on a tape cartridge simultaneously during recall operations.

Responsive to the tape drive returning a LPOS range between EOD and BOR to the host for migrating data, migration program 110 proceeds to append data and perform subsequent steps (path "A" to step 216, step 218, and step 220 of FIG. 2).

Figure 4:
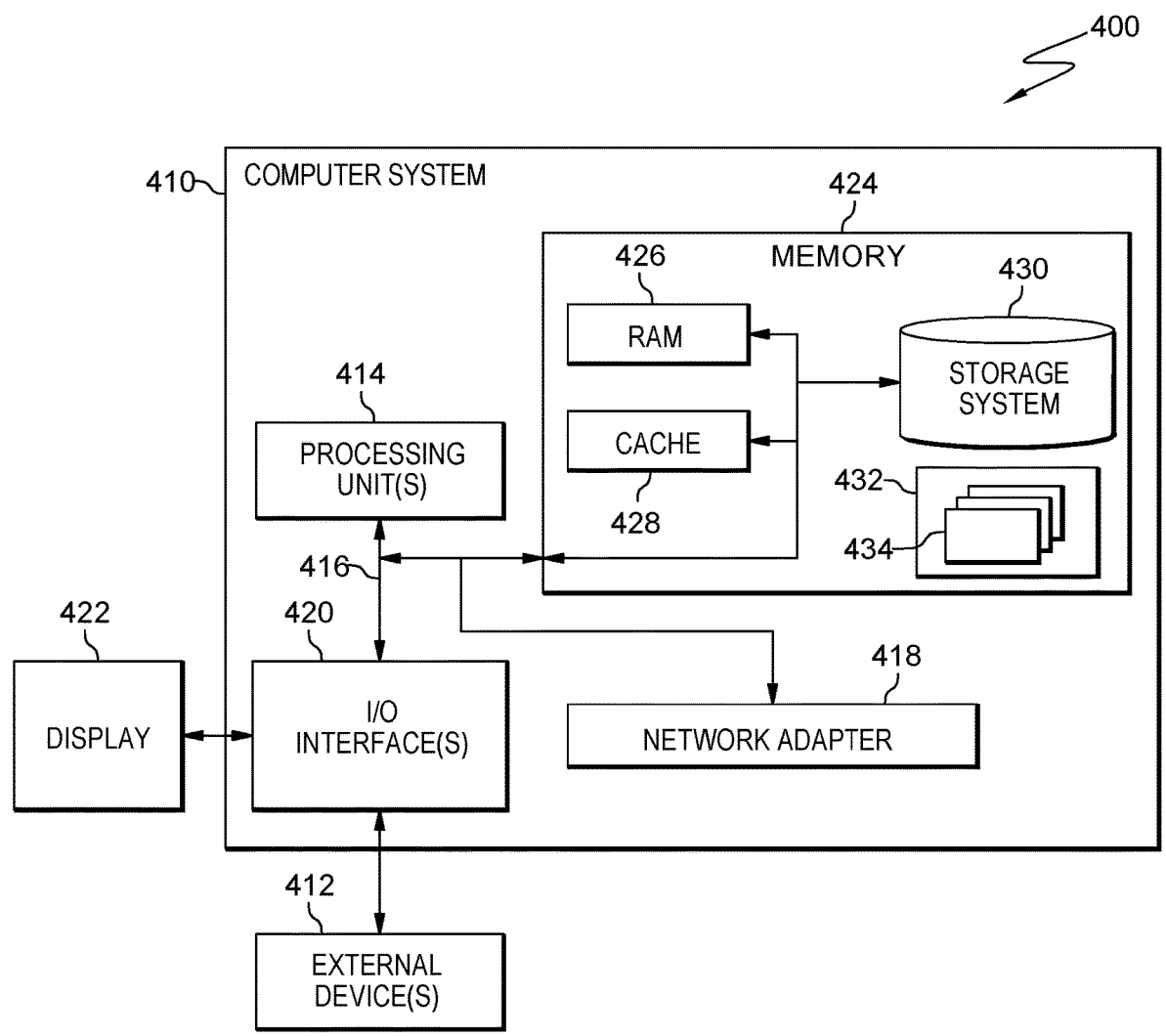
FIG. 4 is a block diagram depicting components of a data processing system, in accordance with an embodiment of the present invention.

FIG. 4 is a block diagram depicting components of computing system, such as server computer 104 of tape library hierarchical storage management environment 100, generally designated 400, in accordance with an embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, server computer 104 in a tape library hierarchical storage management environment 100 is shown in the form of a general-purpose computing device, such as computer system 410. The components of computer system 410 may include, but are not limited to, one or more processors or processing unit(s) 414, memory 424 and bus 416 that couples various system components including memory 424 to processing unit(s) 414.

Bus 416 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 410 typically includes a variety of computer system readable media. Such media may be any available media that is accessible by computer system 410 and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example and not limitation, as well as an operating system, one or more application programs, other program modules and program data. Each of the operating systems, one or more application programs, other program modules and program data or some combination thereof, may include an implementation of a networking environment. Program modules 434 generally carry out the functions and/or methodologies of embodiments of the invention as described herein. Computer system 410 may also communicate with one or more external device(s) 412, such as a keyboard, a pointing device, a display 422, etc. or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks, such as a local area network (LAN), a general wide area network (WAN) and/or a public network (e.g., the Internet) via network adapter 418. As depicted, network adapter 318 communicates with the other components of computer system 410 via bus 416. It should be understood that although not shown, other hardware and software components, such as microcode, device drivers, redundant processing units, external disk drive arrays, RAID systems, tape drives and data archival storage systems may be used in conjunction with computer system 410.

The present invention may be a system, a method and/or a computer program product. The computer program product may include a computer readable storage medium (or media) having computer readable program instructions thereon for causing a processor to carry out aspects of the present invention. In one embodiment, the computer readable storage medium having computer readable program instructions thereon may be internal to a server computer, such as server computer 104. In another embodiment, the computer readable storage medium having computer readable program instructions thereon may be internal to a server computer, such as server computer 104. In other embodiments, the computer readable storage medium having computer readable program instructions thereon may be stored external to a server computer, such as server computer 104, such that a client computer communicates with server computer 104 through a network connection, such as network 102, to execute the computer readable program instructions on a tape library, such as tape library 108.

In another embodiment, the computer readable storage medium having computer readable program instructions thereon may be internal to a tape library, such as tape library 108. In other embodiments, the computer readable storage medium having computer readable program instructions thereon may be stored external to a tape library, such as tape library 108, such that a server computer, such as server computer 104 communicates with tape library 108 through a network connection, such as network 102, to execute the computer readable program instructions on tape library 108.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A computer-implemented method for tape library hierarchical storage management, the method comprising:
    determining, by one or more computer processors, there is available tape capacity on a tape cartridge mounted to a tape drive to migrate data from a migration queue during recall operations;
    sending, by one or more computer processors, a locate end of data (EOD) command to the tape drive;
    determining, by one or more computer processors, the migration queue is within a longitudinal position (LPOS) range associated with a top record block of a recall request; and
    writing, by one or more computer processors, data from the migration queue to the tape cartridge within the LPOS range.

2. The method of claim 1, further comprising:
    accessing, by one or more computer processors, the migration queue on the host to identify one or more migration requests; and
    responsive to identifying at least one migration request within the migration queue, determining, by one or more computer processors, that there is a migration queue.

3. The method of claim 1, further comprising:
    responsive to a determination that there is no migration queue on the host, instructing, by one or more computer processors, the tape drive to locate a tape drive read/write head to a beginning of recall (BOR) data location on the tape cartridge as indicated by a recall request in a recall queue; and
    instructing, by one or more computer processors, the tape drive to read the data starting at the BOR location.

4. The method of claim 1, further comprising:
    calculating, by one or more computer processors, a tape storage capacity to fulfill the one or more migration requests accumulated in the migration queue; and
    responsive to a determination that the tape storage capacity to fulfill the one or more migration requests accumulated in the migration queue is less than an available tape capacity, determining, by one or more computer processors, that there is available tape capacity on the tape cartridge to migrate data during recall operations.

5. The method of claim 1, further comprising:
    responsive to sending the locate EOD command to the tape drive, instructing, by one or more computer processors, the tape drive to determine whether there is an end of data (EOD) location between a current longitudinal position (LPOS) of a tape drive read/write head of the tape drive and beginning of recall (BOR) utilizing a high-resolution tape directory (HRTD) to obtain a position of a beginning of a region divided into equal parts in a longitudinal direction of the tape cartridge.

6. The method of claim 1, further comprising:
selecting, by one or more computer processors, a size of one or more migration requests in the migration queue to prevent passage of written data through beginning of recall (BOR) due to an increase in the LPOS range due to migration of data; and
responsive to a determination that the size of one or more migration requests in the migration queue to be written does not pass through the BOR, determining, by one or more computer processors, that the migration queue is within the LPOS range.

7. The method of claim 1, further comprising:
instructing, by one or more computer processors, the tape drive to determine whether EOD on the tape cartridge is between a current tape drive read/write head position and a beginning of recall (BOR) position.

8. The method of claim 7, further comprising:
responsive to a determination that that EOD on the tape cartridge is between the current tape drive read/write head position and the BOR position, instructing, by one or more computer processors, the tape drive to determine whether a write direction on EOD wrap is a same as a direction of movement for locating the tape drive read/write head to BOR from the current tape drive read/write head position; and
responsive to a determination that a write direction on EOD wrap is the same as the direction of movement for locating to BOR from the current tape drive read/write head position, instructing, by one or more computer processors, the tape drive to determine that the write direction on EOD wrap is the same as the direction of movement for locating to BOR.

9. The method of claim 8, further comprising:
responsive to a determination that the write direction on EOD wrap is the same as the direction of movement for locating to BOR, instructing, by one or more computer processors, the tape drive to locate to EOD and return the LPOS range between EOD and BOR to the host for migrating data on the tape cartridge simultaneously during recall operations.

10. A computer-implemented method for tape library hierarchical storage management, the method comprising:
detecting, by one or more computer processors, at least one recall request in a recall queue on a host;
responsive to a determination that there is a migration queue on the host, determining, by one or more computer processors, there is available tape capacity on a tape cartridge to migrate data concurrently while fulfilling the at least one recall request;
responsive to a determination that there is available tape capacity on the tape cartridge to migrate data, sending, by one or more computer processors, a locate end of data (EOD) command to the tape drive; and
responsive to a determination that the migration queue is within a longitudinal position (LPOS) range associated with a top record block of the recall request, writing, by one or more computer processors, data from the migration queue to the tape cartridge within the LPOS range.

11. A computer-implemented method for tape library hierarchical storage management, the method comprising:
detecting, by one or more computer processors, at least one recall request in a recall queue on a host;
responsive to a determination that there is a migration queue on the host, determining, by one or more computer processors, whether there is available tape capacity mounted on a tape cartridge mounted to a tape drive to migrate data during recall operations;
responsive to a determination that there is available tape capacity on the tape cartridge to migrate data, sending, by one or more computer processors, a locate end of data (EOD) command to the tape drive;
responsive to a determination that a longitudinal position (LPOS) range returned from the tape drive is not a value of zero, determining, by one or more computer processors, whether the migration queue is within the LPOS range associated with a top record block of a recall request; and
responsive to a determination that the migration queue is within the LPOS range, writing, by one or more computer processors, data from the migration queue to the tape cartridge within the LPOS range.

12. A computer program product for tape library management, the computer program product comprising:
one or more computer readable storage media and program instructions stored on the one or more computer readable storage media, the stored program instructions comprising:
program instructions to determine there is available tape capacity on a tape cartridge mounted to a tape drive to migrate data from a migration queue during recall operations;
program instructions to send a locate end of data (EOD) command to the tape drive;
program instructions to determine the migration queue is within a longitudinal position (LPOS) range associated with a top record block of a recall request; and
program instructions to write data from the migration queue to the tape cartridge within the LPOS range.

13. The computer program product of claim 12, the stored program instructions further comprising:
program instructions to access the migration queue on the host to identify one or more migration requests; and
program instructions to, responsive to identifying at least one migration request within the migration queue, determine that there is a migration queue.

14. The computer program product of claim 12, the stored program instructions further comprising:
program instructions to, responsive to a determination that there is no migration queue on the host, instruct the tape drive to locate a tape drive read/write head to a beginning of recall (BOR) data location on the tape cartridge as indicated by the recall request in a recall queue; and
program instructions to instruct the tape drive to read the data starting at the BOR location.

15. The computer program product of claim 12, the stored program instructions further comprising:
program instructions to calculate a tape storage capacity to fulfill the one or more migration requests accumulated in the migration queue; and
program instructions to, responsive to a determination that the tape storage capacity to fulfill the one or more migration requests accumulated in the migration queue is less than an available tape capacity, determine that there is available tape capacity on the tape cartridge to migrate data during recall operations.

16. The computer program product of claim 12, the stored program instructions further comprising:

program instructions to, responsive to sending the locate EOD command to the tape drive, instruct the tape drive to determine whether there is an end of data (EOD) location between a current longitudinal position (LPOS) of a tape drive read/write head of the tape drive and beginning of recall (BOR) utilizing a high-resolution tape directory (HRTD) to obtain a position of a beginning of a region divided into equal parts in a longitudinal direction of the tape cartridge.

17. The computer program product of claim 12, the stored program instructions further comprising:

program instructions to select a size of one or more migration requests in the migration queue to prevent passage of written data through beginning of recall (BOR) due to an increase in the LPOS range due to migration of data; and program instructions to, responsive to a determination that the size of one or more migration requests in the migration queue to be written does not pass through the BOR, determine that the migration queue is within the LPOS range.

18. The computer program product of claim 12, the stored program instructions further comprising:

program instructions to instruct the tape drive to determine whether EOD on the tape cartridge is between a current tape drive read/write head position and a beginning of recall (BOR) position.

19. The computer program product of claim 18, the stored program instructions further comprising:

program instructions to, responsive to a determination that that EOD on the tape cartridge is between the current tape drive read/write head position and the BOR position, instruct the tape drive to determine whether a write direction on EOD wrap is a same as a direction of movement for locating the tape drive read/write head to BOR from the current tape drive read/write head position; and program instructions to, responsive to a determination that a write direction on EOD wrap is the same as the direction of movement for locating to BOR from the current tape drive read/write head position, instruct the tape drive to determine that the write direction on EOD wrap is the same as the direction of movement for locating to BOR.

20. The computer program product of claim 19, the stored program instructions further comprising:

program instructions to, responsive to a determination that the write direction on EOD wrap is the same as the direction of movement for locating to BOR, instruct the tape drive to locate to EOD and return the LPOS range between EOD and BOR to the host for migrating data on the tape cartridge simultaneously during recall operations.

21. A computer system for tape library management, the computer system comprising:

one or more computer processors;
one or more computer readable storage media; and
program instructions stored on at least one of the one or more computer readable storage media for execution by at least one of the one or more computer processors, the stored program instructions comprising:

program instructions to determine there is available tape capacity on a tape cartridge mounted to a tape drive to migrate data from a migration queue during recall operations;

program instructions to send a locate end of data (EOD) command to the tape drive;

program instructions to determine the migration queue is within a longitudinal position (LPOS) range associated with a top record block of a recall request; and program instructions to write data from the migration queue to the tape cartridge within the LPOS range.

22. The computer system of claim 21, the stored program instructions further comprising:

program instructions to access the migration queue on the host to identify one or more migration requests; and program instructions to, responsive to identifying at least one migration request within the migration queue, determine that there is a migration queue.

23. The computer system of claim 21, the stored program instructions further comprising:

program instructions to, responsive to a determination that there is no migration queue on the host, instruct the tape drive to locate a tape drive read/write head to a beginning of recall (BOR) data location on the tape cartridge as indicated by the recall request in a recall queue; and program instructions to instruct the tape drive to read the data starting at the BOR location.

24. The computer system of claim 21, the stored program instructions further comprising:

program instructions to calculate a tape storage capacity to fulfill the one or more migration requests accumulated in the migration queue; and program instructions to, responsive to a determination that the tape storage capacity to fulfill the one or more migration requests accumulated in the migration queue is less than an available tape capacity, determine that there is available tape capacity on the tape cartridge to migrate data during recall operations.

25. The computer system of claim 21, the stored program instructions further comprising:

program instructions to, responsive to sending the locate EOD command to the tape drive, instruct the tape drive to determine whether there is an end of data (EOD) location between a current longitudinal position (LPOS) of a tape drive read/write head of the tape drive and beginning of recall (BOR) utilizing a high-resolution tape directory (HRTD) to obtain a position of a beginning of a region divided into equal parts in a longitudinal direction of the tape cartridge.

* * * * *